United States Patent
Ryu

(10) Patent No.: US 6,591,368 B1
(45) Date of Patent: Jul. 8, 2003

(54) METHOD AND APPARATUS FOR CONTROLLING POWER OF COMPUTER SYSTEM USING WAKE UP LAN (LOCAL AREA NETWORK) SIGNAL

(75) Inventor: Chang-hyun Ryu, Sungnam (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 0 days.

(21) Appl. No.: 09/363,658

(22) Filed: Jul. 30, 1999

(30) Foreign Application Priority Data

Jul. 30, 1998 (KR) ........................................ 1998-30934

(51) Int. Cl.[7] ................................................. G06F 1/26

(52) U.S. Cl. ........................ 713/323; 710/310; 710/324

(58) Field of Search ................................ 713/323, 324, 713/300, 310, 320, 330, 340; 709/222, 223, 217

(56) References Cited

U.S. PATENT DOCUMENTS

| | | | |
|---|---|---|---|
| 5,167,024 A | | 11/1992 | Smith et al. |
| 5,463,261 A | * | 10/1995 | Skarda et al. ............... 307/131 |
| 5,596,628 A | | 1/1997 | Klein |
| 5,652,892 A | | 7/1997 | Ugajin |
| 5,689,715 A | | 11/1997 | Crump et al. |
| 5,742,833 A | | 4/1998 | Dea et al. |
| 5,758,175 A | | 5/1998 | Fung |
| 5,802,305 A | | 9/1998 | McKaughan et al. |
| 5,835,719 A | * | 11/1998 | Gibson et al. ............... 709/221 |
| 5,842,028 A | | 11/1998 | Vajapey |
| 5,889,933 A | * | 3/1999 | Smith ............................ 714/20 |
| 5,925,131 A | * | 7/1999 | Novoa et al. ................ 709/208 |
| 6,049,885 A | * | 4/2000 | Gibson et al. ............... 709/223 |
| 6,052,779 A | * | 4/2000 | Jackson et al. ................. 713/2 |
| 6,052,793 A | * | 4/2000 | Mermelstein ............... 713/340 |
| 6,122,748 A | * | 9/2000 | Hobson ....................... 710/104 |
| 6,272,630 B1 | * | 8/2001 | Chen et al. .................... 713/2 |
| 6,272,645 B1 | * | 8/2001 | Wang .......................... 713/310 |
| 6,275,947 B1 | * | 8/2001 | Wang .......................... 713/300 |
| 6,308,278 B1 | * | 10/2001 | Khouli et al. ............... 713/323 |
| 6,408,396 B1 | * | 6/2002 | Forbes ........................ 713/323 |
| 6,408,397 B1 | * | 6/2002 | Alexander et al. .......... 713/340 |
| 6,415,387 B1 | * | 7/2002 | Aguilar et al. .............. 709/203 |

OTHER PUBLICATIONS

U.S. Patent No. 5,802,305 to McKaughan et al., entitled *Sysemt for Remotely Waking a Sleeping Computer in Power Down State by Comparing Incoming Packet to the List of Packets Storing on Network Interface Card*, issued on Sep. 1, 1998.

U.S. Patent No. 5,742,833 to Dea et al., entitled *Programmable Power Management System and Method for Network Computer Stations*, issued on Apr. 21, 1998.

U.S. Patent No. 5,652,892 to Ugajin, entitled *Method and Apparatus for Controlling Remote Power Source*, isssued on Jul. 29, 1997.

U.S. Patent No. 5,689,715 to Crump et al., entitled *Low Power Ring Detect for Computer System Wake–Up*, issued on Nov. 18, 1997.

(List continued on next page.)

*Primary Examiner*—Sumati Lefkowitz
*Assistant Examiner*—X. Chung-Trans
(74) *Attorney, Agent, or Firm*—Robert E. Bushnell, Esq.

(57) ABSTRACT

A method for controlling power of a computer system using a wake up local area network (LAN) signal and an apparatus therefor are provided. The method includes the steps of powering devices other than predetermined peripheral apparatuses sensible to power on/off, when the wake up LAN signal is sensed in the power-off state of the computer system, checking power on enable or disable in wake up LAN enable from the system setup state during booting of the computer, and powering on the predetermined peripheral apparatuses if a system is set to power on enable, and powering off the devices powered on in the step of checking power on enable or disable if not.

33 Claims, 5 Drawing Sheets

OTHER PUBLICATIONS

U.S. Patent No. 5,758,175 to Fung, entitled *Multi–Mode Power Switching for Computer Systems*, issued on May 26, 1998.

U.S. Patent No. 5,167,024 to Smith et al., entitled *Power Management for a Laptop Computer With Slow and Sleep Modes*, issued on Nov. 24, 1992.

U.S. Patent No. 5,596,628 to Klein, entitled *Method and Apparatus for Initiating Loading of Software in a Personal Computer in Response to an Incoming Signal*, issued on Jan. 21, 1997; and .

U.S. Patent No. 5,842,028 to Vajapey, entitled *Method for Waking up an Integrated Circuit From Low Power Mode*, issued on Nov. 24, 1998.

* cited by examiner

METHOD AND APPARATUS FOR CONTROLLING POWER OF COMPUTER SYSTEM USING WAKE UP LAN (LOCAL AREA NETWORK) SIGNAL

CLAIM OF PRIORITY

This application makes reference to, incorporates the same herein, and claims all benefits accruing under 35 U.S.C. §119 from an application for METHOD AND APPARATUS FOR CONTROLLING POWER OF COMPUTER SYSTEM USING WAKE ON LAN (LOCAL AREA NETWORK) SIGNAL earlier filed in the Korean Industrial Property Office on Jul. 30, 1998 and there duly assigned Ser. No. 30934/1998.

FIELD OF THE INVENTION

The present invention relates to power control of a computer, and more particularly, to method and apparatus for controlling the power of a computer using a wake up local area network (LAN) signal generated by a network administrator of a computer network.

DESCRIPTION OF THE RELATED ART

U.S. Pat. No. 5,802,305 for a System For Remotely Waking a Sleeping Computer in Power Down State by Comparing Incoming Packet to the List of Packets Storing on Network Interface Card to McKaughan et al. discloses a Local Area Network where one computer can access and turn the power on to a remote computer. U.S. Pat. No. 5,689,715 for a Low Power Ring Detect For Computer System Wake-Up to Crump et al. discloses power management control of a remote computer from a telephone. However, these references do not disclose powering up or powering down certain select peripherals of the computer from a remote location. Instead, they power up or power down the entire computer system. In addition, the computers described by the above prior art do not contain a computer flag which allows the computer peripherals to be power managed from a remote location in a network.

SUMMARY OF THE INVENTION

It is an objective of the present invention to provide a method for controlling the power of a computer system using a wake up LAN signal, by which an apparatus is protected by controlling power of a predetermined apparatus such as a hard disk after checking the system setup state, even if the system is automatically powered on by the wake up LAN signal.

It is another objective of the present invention to provide an apparatus for controlling the power of the computer system using a wake up LAN signal performing the above method.

It is still another objective of the present invention to provide a method for controlling the power of a computer system using a wake up LAN signal, by which power on enable/disable is set in a system in wake up LAN enable, to thereby suppress power-on in input of an undesired wake up LAN signal.

It is still an object to power manage certain select peripherals of a computer system from a remote location in a computer network.

It is yet another object to have a software flag for each peripheral in a computer system that enables or disables the peripherals to be power managed from a remote location.

Accordingly, to achieve the first objective, there is provided a method for controlling the power of a computer system using a wake up LAN signal including the steps of: (a) powering devices other than predetermined peripheral apparatuses sensible to power on/off, when the wake up LAN signal is sensed in the power-off state of the computer system; (b) checking power on enable or disable in wake up LAN enable from the system setup state during booting of the computer; and © powering on the predetermined peripheral apparatuses if a system is set to power on enable, and powering off the devices powered on in step (a) if not.

To achieve the second objective, there is provided an apparatus for controlling the power of a computer system using a wake up LAN signal including: a power controlling unit generating a first control signal when the wake up LAN signal is sensed, and generating a second control signal in accordance with the setup state of the system; a first switch connected to a predetermined power supply, and supplying the power to devices of the system other than predetermined peripheral apparatuses sensible to powering on and off in response to the first control signal; and a second switch supplying power to the peripheral apparatuses in response to the second control signal.

To achieve the third objective, there is provided a method for controlling power of a computer system using awake up LAN signal including the steps of (a) setting the power on enable or disable in wake up LAN enable, (b) checking information on the wake up LAN set in step (a), when the wake up LAN signal is sensed in the power-off state of the computer system, (c) powering on the computer system when the system is set to the power on enable state powering off the computer system if not, and (d) powering on the computer system when the information on the wake up LAN is not checked in step (b).

BRIEF DESCRIPTION OF THE DRAWINGS

A more complete appreciation of the invention, and many of the attendant advantages thereof, will be readily apparent as the same becomes better understood by reference to the following detailed description when considered in conjunction with the accompanying drawings in which like reference symbols indicate the same or similar components, wherein.

DETAILED DESCRIPTION OF THE INVENTION

Figure 1:
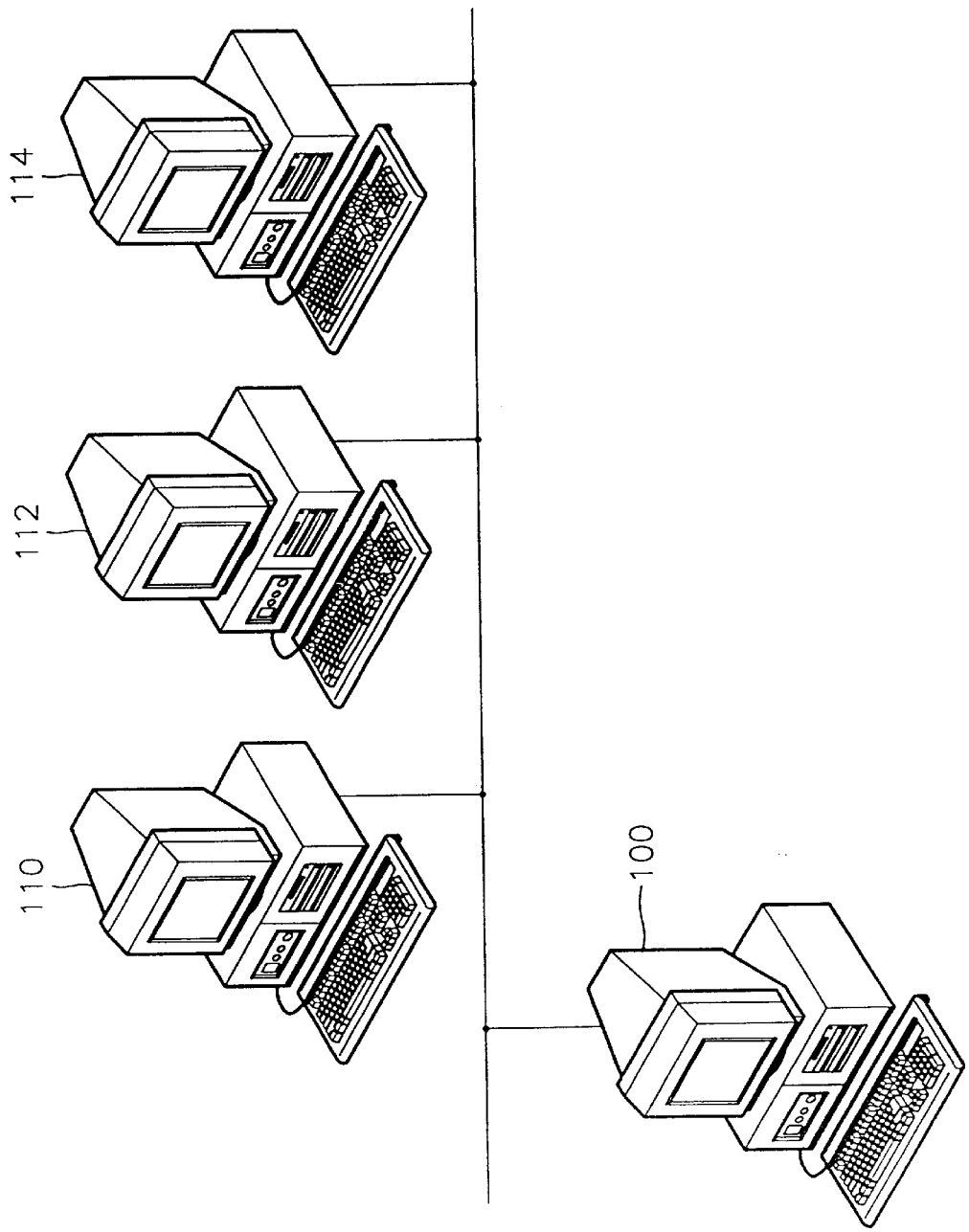
FIG. 1 is a schematic view of a computer network.

FIG. 1 is a schematic view of a computer network. Here, a network administrator 100 is connected to a plurality of computers 110, 112, 114, . . . corresponding to terminals. For example, adjacent computers in an office or in a building are connected to each other by a local area network (LAN) to share various resources.

A method for remotely controlling the power of a computer is desired to enable easy management of computers and reduce the maintenance cost of the computer. That is, even when a computer is powered off by a user, the computer can be remotely powered on automatically by the network administrator 100 at a predetermined time. The powered off system is remotely awakened and then booted by the wake up LAN signal in accordance with a wire management specification.

Figure 2:
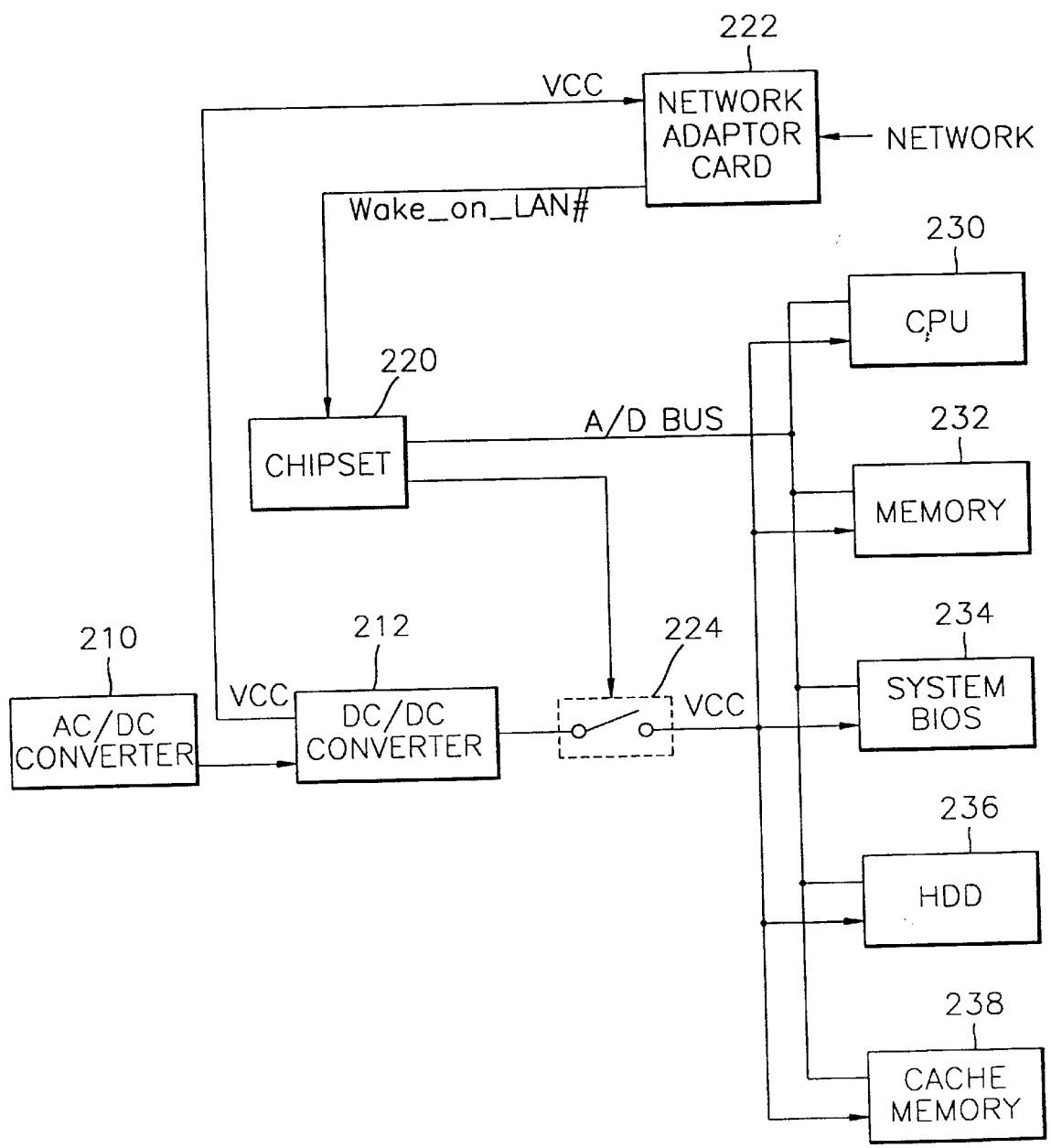
FIG. 2 is a block diagram of a system power switching apparatus constructed to provide a wake up LAN signal.

FIG. 2 is a block diagram of a system power switching apparatus of a wake up LAN signal. The computer system having an AC-to-DC converter 210, a DC-to-DC converter 212, a CPU 230, a memory 232, a system bios 234, a hard disk drive (HDD) 236 and a cache memory 238 further includes a chipset 220, a switch 224 and a network adaptor card 222 which are for automatic power-on in accordance with a wake up LAN signal.

Referring to FIG. 2, even if the system is powered off, i.e., even if all devices in the computer system are turned off by switching off the switch 224, the chipset 220 and the network card 222 are supplied with power from the DC-to-DC converter 212 to be in a sleep mode in which little power is consumed. Here, the DC-to-DC converter 212 is in an enable state until the power-cord of a computer is pulled out of an electrical socket by a user. When the system is powered off and a wake up LAN signal is input through the network card 222, the chipset 220 automatically turns on the switch 224 to power on the system. That is, the chipset 220 automatically switches the power of the system on or off in accordance with the wake up LAN signal.

However, when the system is powered on by the chipset 220, there are problems as follows. The chipset has to support a sleep mode, and can operate due to waking by the wake up LAN signal. In other words, the wake up LAN function is entirely performed by the chipset, so that undesired powering on of a computer cannot be prevented.

Also, when the power of the system is completely off, and then power is again supplied, the system is awakened to check the setup state of the current system. At this time, even if the chipset 220 automatically powers the system on in accordance with the wake up LAN signal, the system is again powered off when power-on in accordance with the wake up LAN function is not set in the checked system setup state. As described above, when the power of the system is repeatedly turned on or off by an undesired power-on, the state of a predetermined apparatus such as a hard disk driver may become very unstable.

Figure 3:
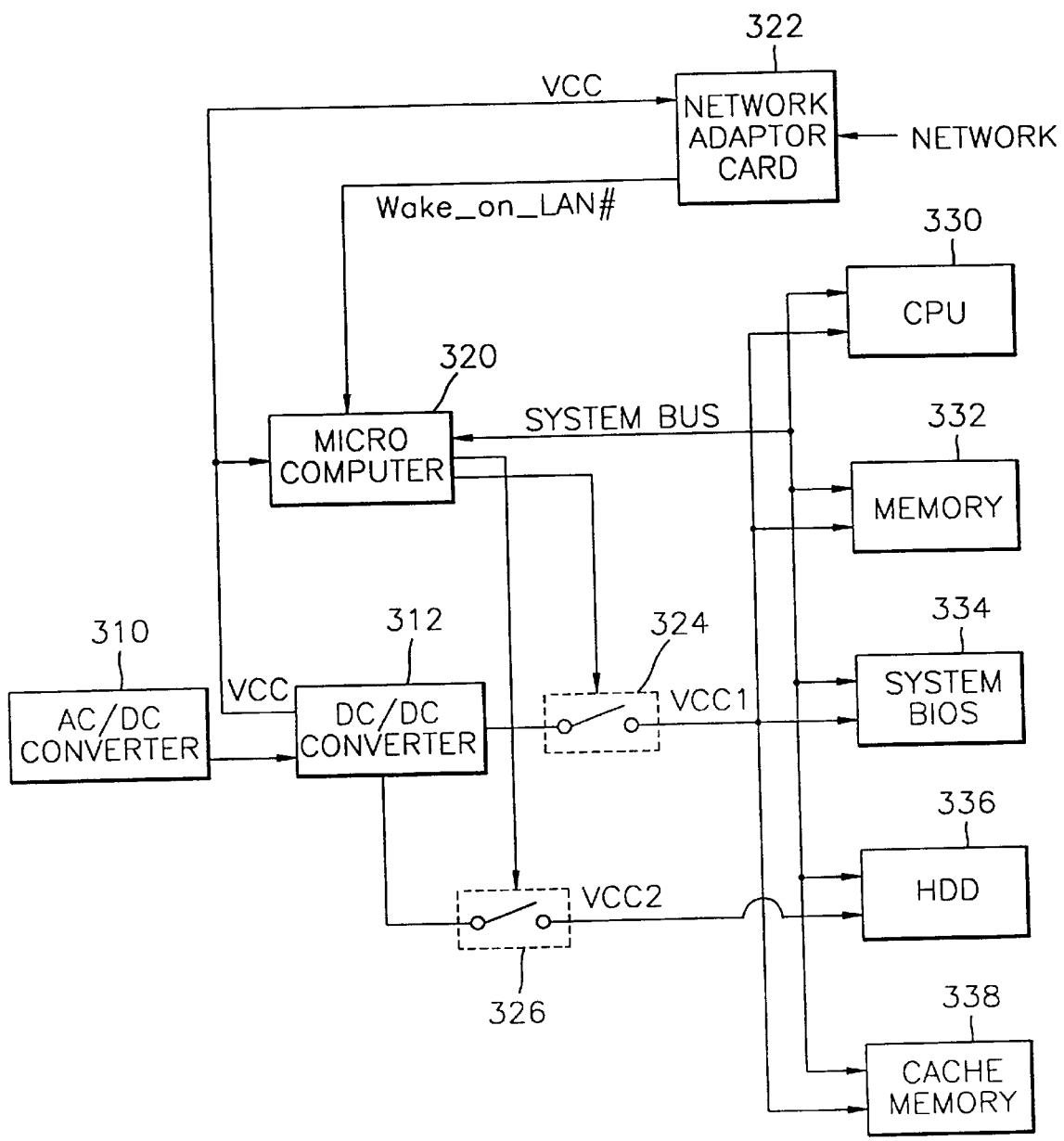
FIG. 3 is a block diagram of an apparatus for controlling system power using a wake up LAN signal according to the present invention.

In FIG. 3, a computer system having an AC-to-DC converter 310, a DC-to-DC converter 312, a CPU 330, a memory 332, a system bios 334, a hard disk drive (HDD) 336 and a cache memory 338 further includes a microcomputer 320, a network card 322, a first switch 324 and a second switch 326 which are for controlling the power of a system using a wake up LAN signal. The microcomputer 320 corresponding to a preferred embodiment of a power controller is supplied by the power from the DC-to-DC converter 312 regardless of the computer being in a power-off-state, senses a signal change by connecting one input pin to the wake up LAN signal line of the network card 322, and controls the first and the second switches 324 and 326 forming the power supply switching portion. Also, the microcomputer 320 is connected to a computer system such as the CPU 330, the memory 332 and the system bios 334 through a system bus, and receives a predetermined command with respect to the wake up LAN signal from the CPU 330.

The network card 322 is supplied with power from the DC-to-DC converter 312 regardless of the system being in a power off state like the microcomputer 320. Here, the DC-to-DC converter 312 is in an enabled state until a power supply plug is pulled out of the socket. Meanwhile, the first switch 324 supplies power from the DC-to-DC converter 312 to devices other than predetermined apparatuses such as the HDD 336 under the control of the microcomputer 320, and the second switch 326 supplies power to predetermined apparatus such as the HDD 336.

The operation will be described with reference to FIG. 3. Even when the power of the system is off, that is, all components of the computer system are off by turning off the first and the second switches 324 and 326, the microcomputer 320 and the network card 322 are supplied with power of the DC-to-DC converter 312 to be in a sleep mode in which little power is consumed.

At this time, the microcomputer 320 receives a power on enable/disable command with respect to the wake up LAN signal from the CPU 330 before being in the sleep mode state. That is, a menu of the wake up LAN enable is preset by a user before power-off, and then the CPU 330 commands the power on enable/disable in accordance with the system set-up state to the microcomputer 320.

When the wake up LAN signal is sensed through the network card 322, after the microcomputer 320 is in a sleep mode, the microcomputer 320 checks preset information even though the wake up LAN is enabled. Then, when the microcomputer 320 is not set to the power-on enable by checking preset information, the system is not powered on. However, when the microcomputer 320 is set to the power-on enable state by checking preset information, control signals are generated in the first and the second switches 324 and 326 to power the system on.

Meanwhile, when there is no information on the wake up LAN function, the microcomputer 320 is determined to be in a power-on enable state by default, to thereby automatically power on the system. That is, when no commands are received from the CPU 330 before the microcomputer 320 is in the sleep mode, the system is powered on.

At this time, the microcomputer 320 supplies power from the DC-to-DC converter 312 to devices other than predetermined apparatuses as such as the hard disk drive 336 by turning on the first switch 324. When the CPU 330 determines the current system setup state using a CMOS RAM after booting the computer, and thus the system is set to power on disable in the wake up LAN enable, the CPU 330 commands the microcomputer 320 to power the system off.

Also, in order to prevent power from being applied to a predetermined apparatus such as the hard disk drive 336 before the system is powered off by the CPU 330, the system bios 334 controls the power on/off of the hard disk drive 336. The system bios 334 checks the current setup state. When the system is set to be power-on disable in the wake up LAN enable state, the CPU 330 commands the microcomputer 320 to power the system off. However, when the system is set to power-on enable, the CPU 330 commands the microcomputer 320 to turn on the second switch 326, to thereby supply power to a predetermined apparatus such as the hard disk drive 336.

A method for controlling power will be described in a preferred embodiment of the apparatus for controlling the power of the computer system.

Figure 4:
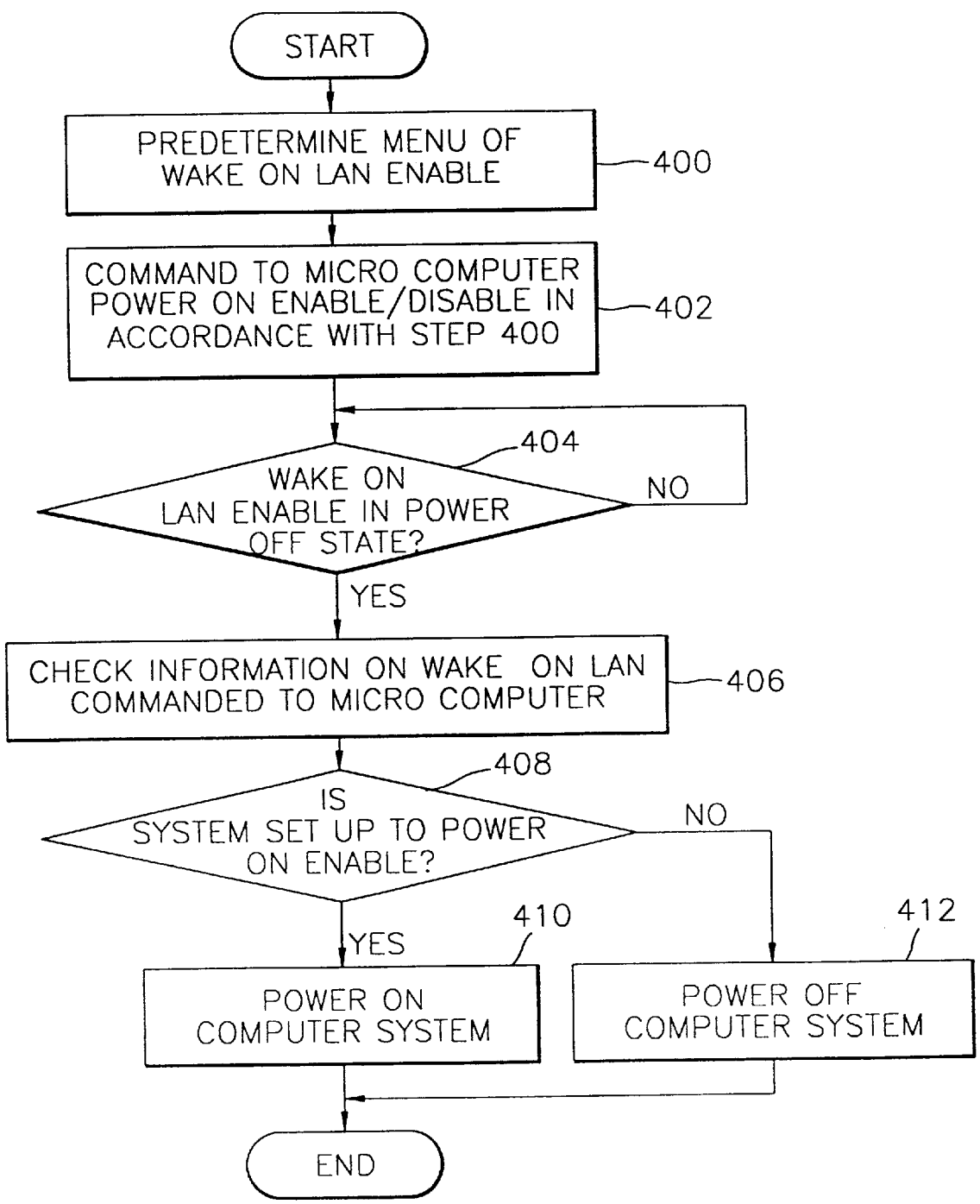
FIG. 4 is a flowchart for illustrating a preferred embodiment of a method for controlling system power using a wake up LAN signal according to the present invention.

Referring to FIG. 4, a menu of a wake up LAN enable is set by a user (step 400). That is, on a system setup the menu of the wake up LAN enable can be set by a user, and whether the power on is enabled or disabled during the wake up LAN enable is determined. After step 400, the CPU commands the microcomputer power on enable/disable before powering the system off, i.e., the CPU commands the power controller for sensing the wake up LAN signal and controlling the power of the system (step 402).

When the computer system is powered off after determining power on enable or disable for the wake up LAN signal through steps 400 and 402, it is checked whether the wake up LAN is enabled or not. When the wake up LAN signal is sensed in the power off state, the information on the wake up LAN in the microcomputer is checked (step 406).

It is determined whether the system is set up by the power on enable or not (step 408). When the system is set up to power on enable, the computer system is powered on (step 410). If the system is set up to power on disable, the computer system is not powered on regardless of the sensed wake up LAN signal (step 412).

Here, when the microcomputer is not commanded by the CPU, the information on the predetermined wake up LAN may not be checked in step 406. At this time, the power on enable is set by default, and the computer system is automatically powered on. Other embodiments may be proposed as follows.

Figure 5:
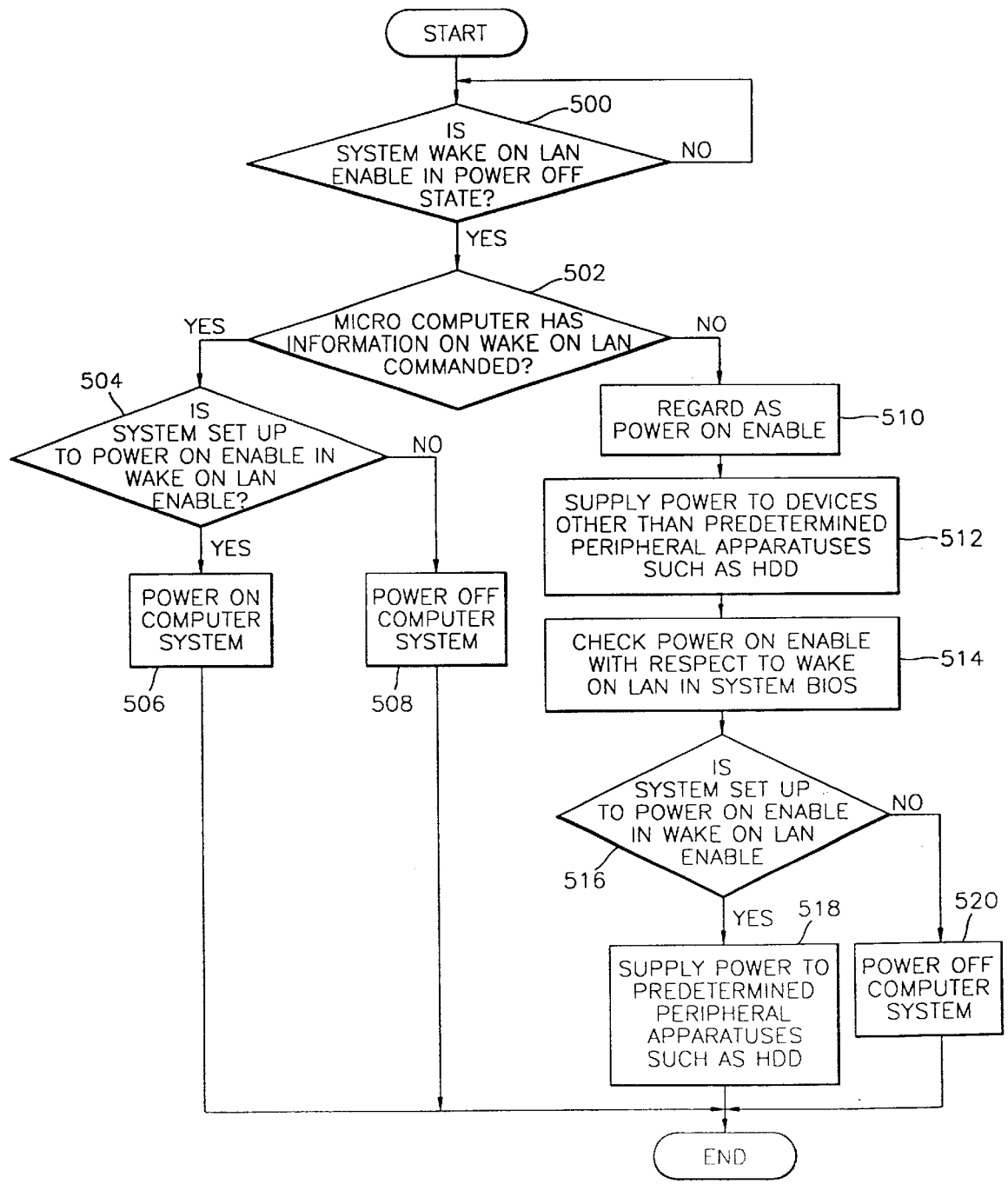
FIG. 5 is a flowchart for illustrating another preferred embodiment of a method for controlling system power using a wake up LAN signal according to the present invention.

Referring to FIG. 5, it is checked whether the wake up LAN signal is sensed according to the wake up LAN enable in the power off state of the computer system (step 500). When the microcomputer senses the wake up LAN signal, it is checked whether there is information on the wake up LAN commanded (step 502). When there is information, it is determined whether the system is set up to power on enable in wake up LAN enable (step 504). If the system is set up to power on enable, the computer system is powered on (step 506), and if not, the computer is not powered on (step 508).

However, if there is no information on the wake up LAN commanded in step 502, the system is regarded to be set as power on enable (step 510). Power is supplied to devices other than predetermined apparatuses such as the hard disk drive sensible to the power-on/off (step 512). During booting of the computer, the power on enable or disable with respect to the wake up LAN in the system bios is checked (step 514).

It is determined whether the system is set up to power on enable in the wake up LAN enable (step 516). If so, power is supplied to the predetermined apparatus such as the hard disk drive (step 518). However, when the system is set up to power on disable, the powered-on devices in step 512 are again powered off (step 520).

As described above, according to the apparatus and the method for controlling system power using the wake up LAN signal of the present invention, the wake up LAN function is provided regardless of the chipset, and the system can be prevented from being powered on due to an undesired wake up LAN signal, and damage to the hard disk drive influenced by the power-on/off can be prevented.

What is claimed is:

1. A method for controlling power of a computer system using a wake up local area network (LAN) signal, comprising the steps of:

powering devices other than predetermined peripheral apparatuses sensible to power on/off, when the wake up LAN signal is sensed in the power-off state of the computer system;

checking power on enable or disable in wake up LAN enable from the system setup state during booting of the computer; and powering on the predetermined peripheral apparatuses if a system is set to power on enable, and powering off said devices other than predetermined peripheral apparatuses sensible to power on/off when the wake up LAN signal is sensed in the power-off state of the computer system if a system is not set to power on enable.

2. The method of claim 1, said system setup state being BIOS in said computer system.

3. The method of claim 1, said predetermined peripheral apparatuses being only a hard disk drive in said computer system.

4. The method of claim 1, said method being proceeded by a user programming said power on enable or disable in said system setup followed by powering down said computer system prior said sensing of said wake up LAN signal.

5. An apparatus for controlling power of a computer system using a wake up LAN signal, comprising:

a power controlling unit generating a first control signal when the wake up LAN signal is sensed, and generating a second control signal in accordance with the setup state of the system;

a first switch connected to a predetermined power supply, and supplying the power to devices of the system other than predetermined peripheral apparatuses sensible to powering on and off in response to the first control signal; and a second switch supplying power to the peripheral apparatuses in response to the second control signal.

6. The apparatus of claim 5, wherein the power controlling unit receives a power on enable/disable command with respect to the wake up LAN signal set in accordance with setup state of the system from the CPU before powering the system off, and regards the system to be power on enable to generate the first control signal when it doesn't receive information on the wake up LAN, and generates the second control signal when the power on enable is checked from the system setup state during booting of the computer.

7. The apparatus of claim 5, said second switch supplying power to all remaining peripheral apparatuses not powered on by said first switch.

8. The apparatus of claim 7, said first switch and said second switch both being controlled by a microcomputer that can detect the sensing of said wake up LAN signal, said microcomputer and also can detect said setup state of the system.

9. The apparatus of claim 5, said second switch supplying power only to said hard disk drive, said first switch not supplying power to said hard disk drive.

10. The apparatus of claim 5, said second switch supplying power to all remaining peripheral apparatuses not powered on by said first switch only when said wake up LAN signal is sensed and only when said setup state of the system is set to power on all peripheral apparatuses in response to said sensing of said wake up LAN signal.

11. The apparatus of claim 5, said setup state of the system being a flag stored in BIOS that determines whether to power up all peripheral apparatuses in response to the sensing of the wake up LAN signal or not to power up all the peripheral apparatuses in response to the sensing of the wake up LAN signal.

12. A method for controlling power in a user's computer connected to a network of computers via a LAN cable, said method comprising the steps of:

programming a power on enable/disable flag in said user's computer by a user when said user's computer is powered on;

powering down said user's computer;

sensing, by said user's computer, a wake up LAN signal sent from another computer in said network via said LAN cable to said user's computer;

powering on only certain predetermined peripheral devices in said user's computer;

checking a status of said power on enable/disable flag;

powering on all peripherals in said user's computer when said flag is set to enable; and powering off said certain predetermined peripheral devices when said flag is set to disable.

13. The method of claim 12, said powering down said user's computer step being powering down of all peripherals in said user's computer but still having some power being applied to a network adapter card and a microcomputer for sensing said wake up LAN signal and for powering on only said certain predetermined peripheral devices in said user's computer upon said sensing of said wake up LAN signal.

14. The method of claim 12, said programming by said user being in said BIOS of said user's computer.

15. The method of claim 12, said certain predetermined peripheral devices in said user's computer comprising said BIOS and a CPU in said user's computer.

16. The method of claim 12, said certain predetermined peripheral devices in said user's computer not including a hard disk drive in said user's computer.

17. A method for controlling power in a user's computer connected to a network of computers via a LAN cable, said method comprising the steps of:

programming said user's computer by said user as to whether or not said user's computer is to power on upon a sensing, by said user's computer, a wake up LAN signal sent from another computer in said network over said LAN cable to said user's computer;

powering down said user's computer;

sensing, by said user's computer, a wake up LAN signal sent from another computer in said network to said user's computer;

determining whether said user had previously programmed said user's computer to respond to said wake up LAN signal;

booting up said computer and powering on all peripherals when said user had previously programmed said computer to respond to said wake up LAN signal; and not responding to said wake up LAN signal when said user had previously programmed said computer not to respond to said wake up LAN signal.

18. The method of claim 17, said powering down steps being placing said user's computer in a standby state where said user's computer can sense said wake up LAN signal, can determine whether said user had programmed said computer to respond to said wake up LAN signal and can power on all peripheral devices in said user's computer and boot up said user's computer in response to said sensing of said wake up LAN signal when said user had previously programmed said user's computer to do so.

19. The method of claim 17, said programming being in a CPU and microcomputer in said user's computer, said microcomputer receiving power even when said user's computer is powered down.

20. A method for controlling power in a user's computer connected to a network of computers via a LAN cable, said method comprising the steps of:

powering down said user's computer to a standby state where all peripheral devices of said user's computer are without power, said peripheral devices comprising a CPU, a system BIOS, and various memories comprising a hard disk drive;

sensing, by said user's computer, a wake up LAN signal sent from another computer in said network via said LAN cable to said user's computer;

checking whether a microcomputer in said user's computer is programmed as to whether or not said user's computer is to respond to said wake up LAN signal;

powering on all peripheral devices and booting up said user's computer when said microcomputer is programmed to respond to said wake up LAN signal;

disregarding said wake up LAN signal when said microcomputer is programmed to ignore said wake up LAN signal;

applying power only to certain predetermined peripheral devices when said microcomputer is not programmed to either respond to or ignore said wake up LAN signal;

checking said BIOS in said user's computer as to whether or not to respond to or ignore said wake up LAN signal when said microcomputer is not programmed to either respond to or ignore said wake up LAN signal;

applying power to all remaining peripheral devices that are currently powered down when said BIOS is programmed to respond to said wake up LAN signal and when said microcomputer is not programmed to either respond to or ignore said wake up LAN signal; and powering down said user's computer to said standby state where all peripheral devices of said user's computer are without power when said BIOS is programmed to ignore said wake up LAN signal and when said microcomputer is not programmed to either respond to or ignore said wake up LAN signal.

21. The method of claim 20, said certain predetermined peripheral devices comprises said system BIOS.

22. The method of claim 20, said certain predetermined peripheral devices does not comprise said hard disk drive.

23. The method of claim 20, said standby state having some power applied to said microcomputer to detect said programming.

24. The method of claim 20, said standby state having some power applied to a network adaptor card to sense said wake up LAN signal when said user's computer is in said standby state.

25. The method of claim 20, said method being proceeded by a step of a user programming said CPU as to whether or not said user's computer is to respond to or ignore said wake up LAN signal when said wake up LAN signal is sensed by said user's computer, said CPU informing said microcomputer of said programming, said programming taking place when said user's computer is fully powered on and booted up.

26. The method of claim 20, said method being proceeded by a user programming said BIOS as to whether or not to respond to or ignore said wake up LAN signal when said wake up LAN signal is sensed by said user's computer, said CPU informing said microcomputer of said programming, said programming taking place when said user's computer is fully powered and booted up.

27. The method of claim 26, said programming by a user of said BIOS being setting a flag in said BIOS in said user's computer as to whether said user's computer is to respond to or ignore said wake up LAN signal when said user's computer senses said wake up LAN signal.

28. A user's computer connected to a computer network via a LAN cable, said computer comprising:

a network adapter card interfacing said user's computer to said network and receiving commands from said network via said LAN cable whether to power up said user's computer from a standby state, said network adapter card receiving some power when said computer is in said standby state;

a microcomputer connected to said network adapter card; said microcomputer receiving some power when said user's computer is in said standby state;

a first switch connected to said microcomputer and connecting only certain predetermined peripheral devices in said computer to a power supply when said user's computer receives a command from said computer network via said LAN cable to power up said user's computer, said first switch being set not to deliver power when said user's computer is in said standby state;

a second switch connected to said microcomputer and connecting all peripheral devices in said user's computer to a power supply, said second switch being set not to deliver power when said computer is in said standby state; and a power converter providing power only to said microcomputer and said network adapter card when said user's computer is in said standby state and providing power to all peripherals when said user's computer is powered on.

29. The computer of claim 28, said microcomputer being programmed to either respond to or ignore a command received from said network via said LAN cable to power up said user's computer.

30. The computer of claim 28, said first switch being set to deliver power to only said certain predetermined peripheral devices and said second switch not being set to deliver power only when said microcomputer is not programmed to either respond to or ignore a received command from said network over said LAN cable to power up said user's computer.

31. The computer of claim 28, said BIOS being programmed to either respond to or ignore a command received from said network via said LAN cable to power up said user's computer.

32. The computer of claim 28, said certain predetermined peripheral devices not comprising said hard disk drive.

33. The computer of claim 32, said hard disk drive never being powered on when said user's computer receives a power on command via the LAN cable from the computer network and when said microcomputer is not programmed to either respond to or ignore said received command from said network over said LAN cable to power up said user's computer and said BIOS is programmed to ignore said received command from said network over said LAN cable to power up said user's computer.

* * * * *